Aug. 19, 1941. D. S. ANTHONY Re. 21,877
TOOL HOLDER
Original Filed June 2, 1937 2 Sheets-Sheet 1
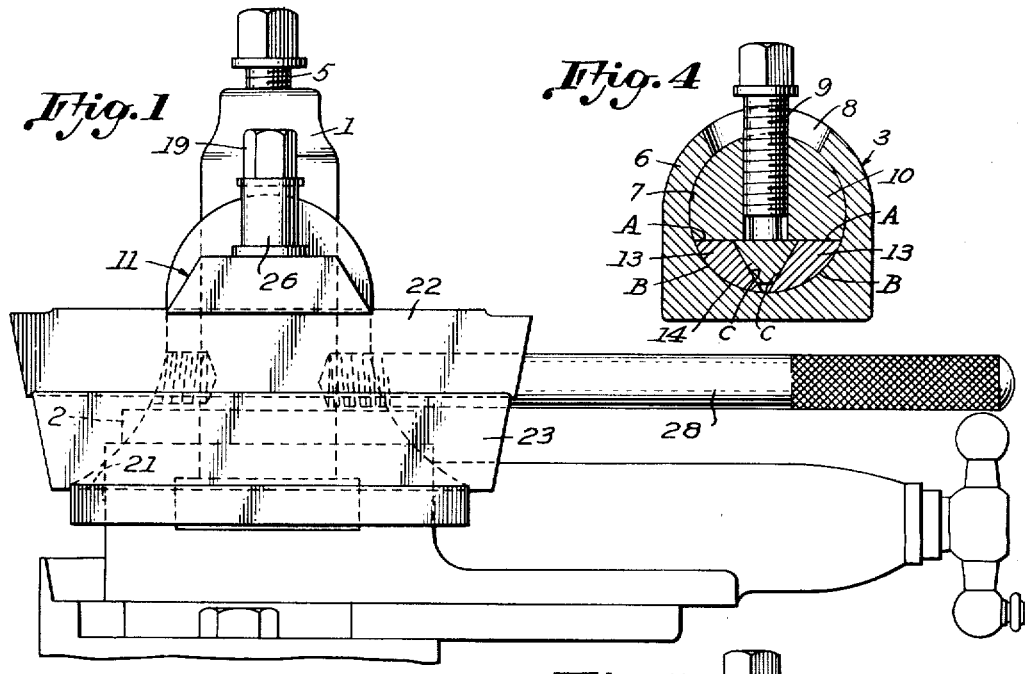
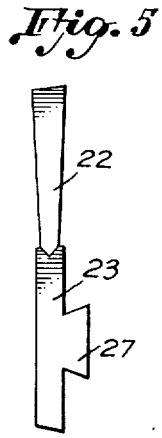
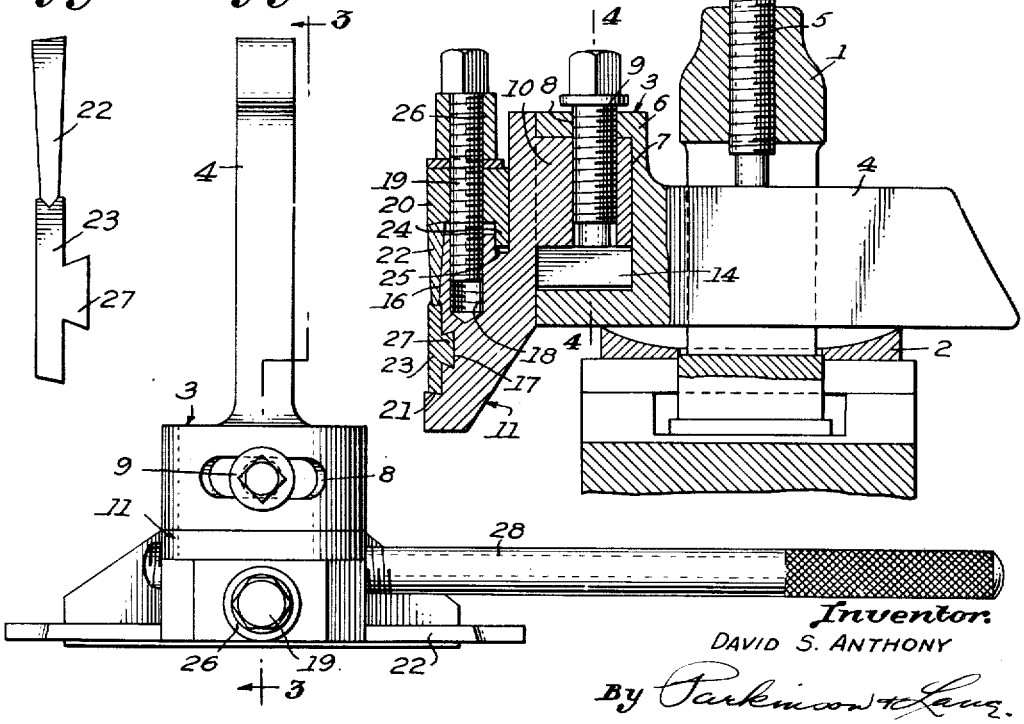
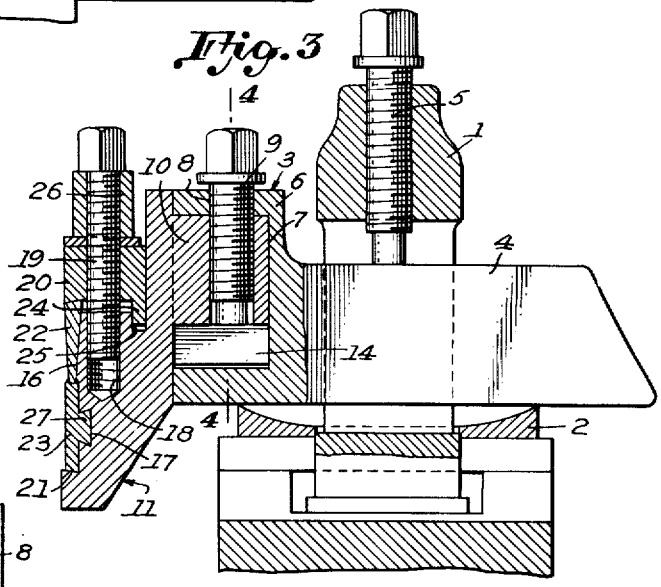
Inventor.
DAVID S. ANTHONY
By Parkinson & Lang.
Attorneys.

Aug. 19, 1941. D. S. ANTHONY Re. 21,877

TOOL HOLDER

Original Filed June 2, 1937 2 Sheets-Sheet 2

Inventor.
DAVID S. ANTHONY

By Parkinson & Lane
Attorneys.

Reissued Aug. 19, 1941

Re. 21,877

UNITED STATES PATENT OFFICE 21,877

TOOL HOLDER

David S. Anthony, San Antonio, Tex.

Original No. 2,149,038, dated February 28, 1939, Serial No. 146,071, June 2, 1937. Application for reissue July 15, 1940, Serial No. 345,679

19 Claims. (Cl. 29—99)

This invention relates to tools and holders therefor employed on power operated high speed lathes and similar machines and has for the primary object the provision of means for supporting a cut-off tool on a lathe and substantially the full length thereof to permit quicker and more accurate cutting of stock to be accomplished and also to permit cutting of larger stock at a high rate of speed.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a tool and tool holder constructed in accordance with my invention and showing the same mounted on a tool post of a lathe.

Figure 2 is a top plan view illustrating the same.

Figure 3 is a sectional view taken on the line 3—3 of Figure 2.

Figure 4 is a detail sectional view taken on the line 4—4 of Figure 3.

Figure 5 is an end view illustrating a modified connection between the tool blade and the support therefor.

Figure 7:
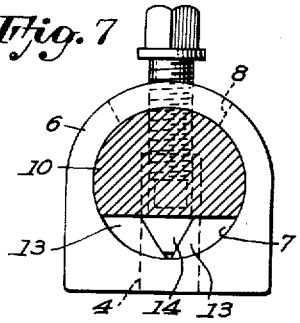
Figure 7 is a mounting for the tool holder.
Figure 6:
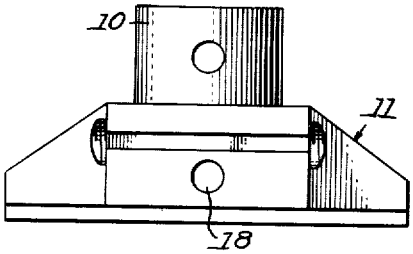
Figure 6 is a plan view illustrating the tool holder or chuck.
Figure 8:
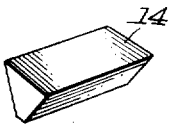
Figure 8 is a perspective view illustrating a wedge-shaped block.

Referring in detail to the drawings, the numeral 1 indicates a tool post of a conventional construction and now employed on lathes and similar machines and which includes a collar 2. A tool holder mounting 3 consists of a shank 4 clamped in the post by the usual set bolt 5 of the post and is capable of being adjusted relative to the post. The shank 4 seats on the collar 2. The collar provides a comparatively broad support for the shank 4. The tool holder mounting 3 also includes a head 6 having a chamber 7 and a slot 8 to receive a set bolt 9. The chamber 7 receives a trunnion 10 having a screw threaded bore to receive the bolt 9 and forms an integral part of a tool holder 11. Engaging the trunnion 10 is a wedge block 14 and a pair of elements indicated by the character 13 and each element is of substantially triangular shape in cross section presenting faces A, B and C. The faces B of the elements 13 contact walls of the chamber 7 while the faces A are contacted by flattened faces of the trunnion 10. The faces C converge and form a seat for the wedge block 14, the latter being of substantially triangular shape in cross section and is engaged by the set bolt. The set bolt placing pressure on the wedge block brings about spreading of the elements 13 to bind against the walls of the chamber thereby effectively locking the tool holder 11 on its tool holder support 3. The slot 8 will permit a limited rotary adjustment of the trunnion 10 in the chamber 7.

The tool holder 11 has a tool engaging wall or face 16 provided with a dovetail shaped groove 17. The tool holder 11 has a screw threaded socket 18 to receive a stud bolt 19 and mounted on said stud bolt is a clamping block 20 to cooperate with a rib or flange 21 of the tool holder 11 in gripping a cutting tool 22 and a support 23 therefor. The clamping block 20 has a flange 24 which extends into a groove 25 formed in the tool holder 11. A spacing collar 26 is arranged between the clamping block 20 and the head of the set bolt. A tenon 27 is formed on the support 23 and fits in the tenon-shaped groove 17 of the tool holder. The tool 22 presents at its ends cutters so that the tool may be used in right and left hand manner. The support 23 for the cutting tool 22 has a groove to receive one edge of the cutting tool. The thickness of the support 23 is slightly less than the thickness of the cutting tool and its length is slightly less than the length of the cutting tool. The thickness of the support 23 being less than the thickness of the cutting tool will permit said support to enter a groove cut in the work or stock by the cutting tool without danger of binding. A suitable handle 28 is provided on the tool holder 11 to permit adjustment of the latter relative to the mounting 3 when the set bolt 9 has been slackened.

It will be seen that the cutting tool is supported by the support 23 substantially throughout its length preventing bending of the tool during a cutting operation and consequently obviating danger of breaking the cutting tool. The support 23 preventing the cutting tool from bending obviates to a great extent the wedging of chips between the stock and the cutting tool. The holder 11 described permits the cutting tool and its support to be readily adjusted or reversed thereon or removed when desired.

One edge of the cutting tool may be of V-shape as shown in Figure 5 and fits in a correspondingly shaped groove formed in one edge of the support 23.

Figure 12:
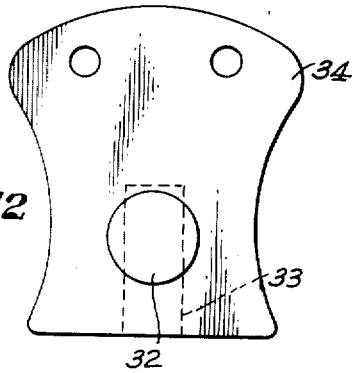
Figure 12 is a view in end elevation of the mounting for the tool holder with the holder detached.
Figure 10:
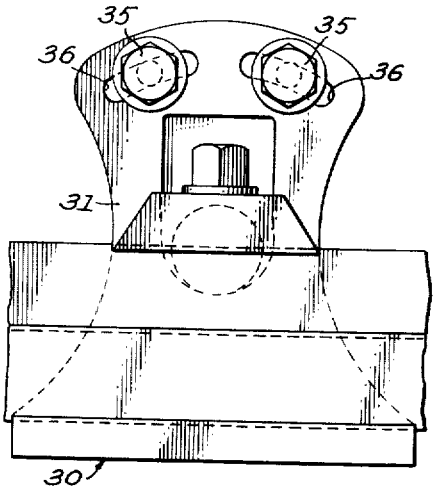
Figure 10 is an end elevation illustrating a modified form of mounting for the tool holder.
Figure 11:
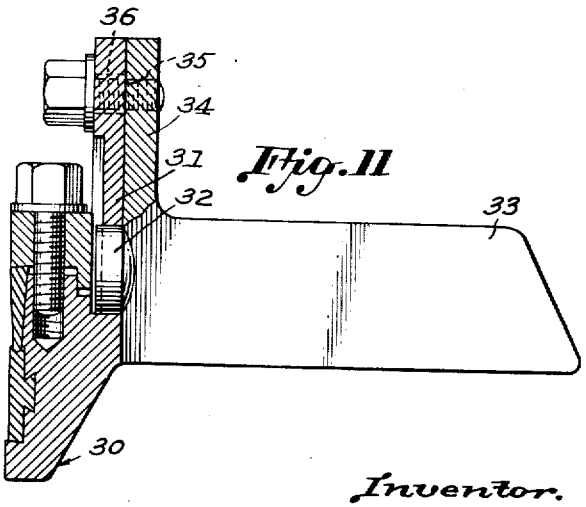
Figure 11 is a side elevation partly in section illustrating the same.
Figure 9:
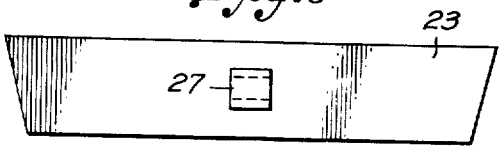
Figure 9 is a view in elevation of the tool support.

Referring to my modified form of the invention, as shown in Figures 10 to 12, inclusive, the tool holder is indicated generally by the character 30 and the mounting of the cutting tool and its support thereon is similar to that shown in Figure 3. The holder 30 has a plate-like portion 31 in which is formed a bearing opening to receive a trunnion 32 formed on the shank 33. Said shank is adapted to the tool post in a manner similar to the shank 4. The shank 33 has formed thereon a plate 34 paralleling the plate 31 and is provided with screw threaded openings to receive stud bolts 35. Said bolts extend through slots 36 formed in the plate 31 whereby the tool holder may be adjusted in a limited rotatable manner on the trunnion 32 and secured in any of its adjusted positions by the stud bolts.

A cutting tool mounted on a lathe as described will permit accurate and rapid cutting of stock of large diameter without the danger of the cutting tool bending or becoming jammed by chips from the stock and also reduces to a minimum the possibility of the cutting tool becoming broken. Further, it will be noted that the cutting tool can be easily adjusted relative to the work or stock. Should the cutting tool be subjected to an excessive strain the tool mounting on the shank will give and further reduce the possibility of the cutting tool breaking from excessive strain. In both forms of the invention, the friction which holds the tool holder in operating position during normal operation occurs between surfaces of revolution co-axial with the holder. In Figs. 1 to 8, inclusive, these surfaces are the cylindrical surfaces formed in the chamber 7 of the head 6 and the cylindrical or arcuate surfaces formed on the elements 13, while in Figs. 10 to 12, inclusive, these friction surfaces are the engaging faces of the plates 31 and 34. With the use of this tool holder and the support 23 for the cutting tool will permit the device to be employed on high speed lathes or similar machines and to cut stock wherein the diameters are much greater than heretofore possible with the conventional type of tool holder or mounting employed on such machines.

To obtain the best results from this cutting tool it is best that the combined width of the cutting blade and its support be approximately one-half of the diameter of the stock to be cut.

What is claimed is:

1. A device of the character set forth comprising a tool holder, a cutting tool mounted on said holder, a support mounted on said holder and supporting the tool substantially the full length thereof, a trunnion formed on said holder and having a screw threaded opening, a pair of elements having wedge-engaging faces and engaging the trunnion, a mounting having a chamber receiving said trunnion and elements, a wedge contacting the wedge engaging faces for forcing said elements against the walls of the chamber, and a set bolt threaded in said opening and bearing against the wedge.

2. A device of the character set forth comprising a tool holder, a cutting tool mounted on said holder, a support mounted on said holder and supporting the tool substantially the full length thereof, a trunnion formed on said holder and having a screw threaded opening, a pair of elements having wedge engaging faces engaging the trunnion, a mounting having a chamber receiving said trunnion and elements, a wedge contacting the wedge engaging faces for forcing said elements against the walls of the chamber, a set bolt threaded in said opening and bearing against the wedge, said mounting having a slot through which the set bolt extends, and a shank formed on said mounting to be received by a tool post.

3. A device of the character set forth comprising a tool holder, a cutting tool carried by said holder, a support carried by said holder and supporting the tool substantially its full length, said holder having slots and a trunnion opening, a shank including a trunnion and a plate with the trunnion fitting in the trunnion opening, and stud bolts threaded into said plate and extending through the slots of the holder.

4. A tool for use in lathes or equivalent machines comprising a mounting for securement in the tool post of the machine, a tool holder swingingly supported in said mounting, means for frictionally restraining swinging movement, a tool blade, a tool blade support interlocked with the holder at a point a substantial distance below the axis of swinging movement of the holder on said mounting, and a clamp block removably secured to the mounting and retaining the blade on the support.

5. A tool for use in lathes or equivalent machines comprising a mounting for securement in the tool post of the machine, a tool holder swingingly supported in said mounting, means for frictionally restraining swinging movement at a plurality of spaced points disposed in lines intersecting the axis of swinging movement, a tool blade, and means for mounting the tool blade on the holder with the cutting edge well below the axis of swinging movement of the holder.

6. A tool for use in lathes or equivalent machines comprising a mounting for securement in the tool post of the machine, a tool holder swingingly supported in said mounting, means for frictionally restraining swinging movement, a tool blade, a tool blade support interlocked with the holder at a point a substantial distance below the axis of swinging movement of the holder on said mounting, and a clamp block removably secured to the mounting and retaining the blade on the support, the tool blade support having a seat in its upper edge for the lower edge of the tool blade and being thinner than the tool blade at the cutting edge of the latter.

7. A tool for use in lathes or equivalent machines comprising a mounting for securement in the tool post of the machine, a tool holder swingingly supported in said mounting, means for frictionally restraining swinging movement, a tool blade, a tool blade support interlocked with the holder at a point a substantial distance below the axis of swinging movement of the holder on said mounting, and a clamp block removably secured to the mounting and retaining the blade on the support, the tool blade support being at least substantially coextensive with the tool blade.

8. A tool for use in lathes or equivalent machines comprising a mounting for securement in the tool post of the machine, a tool holder swingingly supported in said mounting, means for frictionally restraining swinging movement, a tool blade, a tool blade support interlocked with the holder at a point a substantial distance below the axis of swinging movement of the holder on said mounting, and a clamp block removably secured to the mounting and retaining the blade on the support, the tool blade support being bodily adjustable on the tool holder in the direction of the length of the support when the clamp block is released.

9. A tool for use in lathes or equivalent machines comprising a mounting for securement in the tool post of the machine, a tool holder swingingly supported in said mounting, means for frictionally restraining swinging movement, a tool blade, a tool blade support interlocked with the holder at a point a substantial distance below the axis of swinging movement of the holder on said mounting, and a clamp block removably secured to the mounting and retaining the blade on the support, the tool blade support being bodily adjustable on the tool holder in the direction of the length of the support when the clamp block is released, the clamp block having an interlocked connection with the holder and a pendant flange bearing upon the tool blade upon the upper edge.

10. In combination, a machine tool and holder comprising a cutting tool and a support therefor adapted to support the tool along its lower edge, a tool holder for receiving said tool and support and provided with a projecting shoulder, an adjustable clamping member adapted to rigidly clamp the tool and support in operative position between said member and projecting shoulder, said tool and support being substantially co-extensive in length and the maximum thickness of the support being less than the maximum thickness of the cutting tool so that said support may trail the cutting tool into the cut made by the latter without danger of binding.

11. A cut-off tool and holder therefor adapted to be mounted on the tool post of a lathe or the like, comprising a cut-off tool and supporting member for supporting the tool along its lower edge, a tool holder for receiving said tool and supporting member and provided with a projecting flange, an adjustable clamping member adapted to rigidly clamp the tool and supporting member in operative position between said clamping member and projecting flange, and a support for retaining the tool holder on the lathe, said tool and supporting member being of such width that the supporting member extends well below the support for the tool holder.

12. A cut-off tool and holder having a shank adapted to be mounted on the conventional tool post of a high speed lathe or the like, comprising a cut-off tool and support therefor adapted to support the tool along its lower edge, a tool holder for receiving said tool and support and provided with a projecting flange, an adjustable clamping member adapted to rigidly clamp the tool and support in operative position between said member and projecting flange, said tool and support being substantially co-extensive in length and of such width that the support extends well below the lower surface of the shank.

13. A cutting tool and holding device for mounting the tool on a conventional carriage and tool post of a lathe or the like, comprising a holder having a side face and an outwardly projecting flange adjacent its lower edge, a combined cut-off tool and support therefor adapted to seat upon said flange and engage the side face of the holder, and means for retaining the cut-off tool in fixed position in the holder, said means comprising a clamping member overlying the upper edge of the cut-off tool and adapted to exert downward pressure thereon.

14. A cutting tool and holding device for mounting the tool on a conventional carriage and tool post of a lathe or the like, comprising a holder having a side face and an outwardly projecting flange adjacent its lower edge, a combined cut-off tool and support therefor adapted to seat upon said flange and engage the side face of the holder, said cut-off tool and support being longitudinally and independently adjustable, and means for retaining the cut-off tool in fixed position in the holder, said means comprising a clamping member overlying the upper edge of the cut-off tool and adapted to exert downward pressure thereon.

15. A tool holding device for mounting a cutting tool on a lathe or the like, comprising a mounting having a shank adapted to be secured to the conventional tool post of the lathe, a tool holder fulcrumed in said mounting for pivotal movement, friction brake means for restraining rotation of the tool holder in its mounting, said brake means including complementary members on said holder end mounting having engaging faces which are surfaces of revolution co-axial with said holder, and adjustable means for regulating the pressure and frictional contact between said surfaces.

16. A tool holding device for mounting a cutting tool on a lathe or the like, comprising a mounting having a shank adapted to be secured to the conventional tool post of the lathe, a tool holder fulcrumed in said mounting for pivotal movement, friction brake means for restraining rotation of the tool holder in its mounting, said brake means including members on said holder and mounting having engaging faces which are surfaces of revolution co-axial with said holder, an arcuate slot in one of said members, and an adjusting bolt passing through said slot and into the other of said members for regulating the pressure between the engaging faces of said members.

17. A tool holding device for mounting a cutting tool on a lathe or the like, comprising a mounting having a shank adapted to be secured to the conventional tool post of the lathe, a tool holder fulcrumed in said mounting for pivotal movement, friction brake means for restraining rotation of the tool holder in its mounting, said brake means including members on said holder and mounting and having engaging faces which are surfaces of revolution co-axial with said holder and which surfaces are perpendicular to the axis of the tool holder, and means for regulating the pressure between the engaging faces.

18. A cutting tool and holder adapted to be mounted on a lathe or the like, comprising a cutting tool and support therefor adapted to support the tool along its lower edge and of a thickness substantially that of the cutting tool to permit the support to enter a groove cut in the work by the tool without danger of binding, a tool holder for receiving said tool and support and provided with a projecting flange, an adjustable clamping member adapted to rigidly clamp the tool and support in operative position between said member and projecting flange, said tool and support having interengaging surfaces tending to hold them in co-planar relationship.

19. In combination, a machine tool and holder comprising a cutting tool and a support therefor adapted to support the tool along its lower edge and of a thickness substantially that of the cutting tool to permit the support to enter a groove cut in the work by the tool without danger of binding, a tool holder for receiving said tool and support and provided with a projecting shoulder, an adjustable clamping member adapted to rigidly clamp the tool and suport in operative position between said member and projecting shoulder, said tool and support having their abutting surfaces interengaged in such manner as to maintain them in co-planar relationship.

DAVID S. ANTHONY.

CERTIFICATE OF CORRECTION.

Reissue No. 21,877. August 19, 1941.

DAVID S. ANTHONY.

It is hereby certified that error appears in the printed specification of the above numbered patent requiring correction as follows: Page 3, second column, line 26, claim 15, for the word "end" read --and--; and that the said Letters Patent should be read with this correction therein that the same may conform to the record of the case in the Patent Office.

Signed and sealed this 30th day of September, A. D. 1941.

Henry Van Arsdale,
Acting Commissioner of Patents.

(Seal)